(12) United States Patent
Furuta et al.

(10) Patent No.: US 10,988,616 B2
(45) Date of Patent: *Apr. 27, 2021

(54) THERMOSETTING RESIN COMPOSITION, CURED FILM, SUBSTRATE WITH CURED FILM, AND ELECTRONIC COMPONENT

(71) Applicant: JNC CORPORATION, Tokyo (JP)

(72) Inventors: Tomotsugu Furuta, Ichihara (JP); Shinta Morokoshi, Ichihara (JP); Ayako Kikuchi, Ichihara (JP)

(73) Assignee: JNC CORPORATION, Tokyo (JP)

( * ) Notice: Subject to any disclaimer, the term of this patent is extended or adjusted under 35 U.S.C. 154(b) by 919 days.

This patent is subject to a terminal disclaimer.

(21) Appl. No.: 14/907,288

(22) PCT Filed: Jul. 25, 2014

(86) PCT No.: PCT/JP2014/069722
§ 371 (c)(1),
(2) Date: Jan. 24, 2016

(87) PCT Pub. No.: WO2015/012395
PCT Pub. Date: Jan. 29, 2015

(65) Prior Publication Data
US 2016/0160045 A1   Jun. 9, 2016

(30) Foreign Application Priority Data

Jul. 25, 2013   (JP) .............................. JP2013-154880

(51) Int. Cl.
| | | |
|---|---|---|
| *C08L 77/12* | (2006.01) | |
| *C08G 73/10* | (2006.01) | |
| *C08L 63/00* | (2006.01) | |
| *C08L 79/08* | (2006.01) | |
| *C09D 177/12* | (2006.01) | |
| *C08G 59/42* | (2006.01) | |
| *C08K 5/1539* | (2006.01) | |
| *C08G 59/24* | (2006.01) | |
| *C08G 73/16* | (2006.01) | |

(52) U.S. Cl.
CPC .......... *C08L 77/12* (2013.01); *C08G 73/1053* (2013.01); *C08G 73/1064* (2013.01); *C08G 73/1071* (2013.01); *C08G 73/16* (2013.01); *C08L 63/00* (2013.01); *C08L 79/08* (2013.01); *C09D 177/12* (2013.01); *C08G 59/245* (2013.01); *C08G 59/42* (2013.01); *C08K 5/1539* (2013.01); *C08L 2203/206* (2013.01)

(58) Field of Classification Search
CPC .......... C08L 77/12; C08L 63/00; C08L 79/08; C08G 73/1053; C08G 73/1064; C08G 73/1071; C08G 73/16; C09D 177/12
USPC ....................................................... 523/400
See application file for complete search history.

(56) References Cited

U.S. PATENT DOCUMENTS

| | | |
|---|---|---|
| 2008/0152845 A1 | 6/2008 | Itami |
| 2009/0026425 A1 | 1/2009 | Satou et al. |
| 2009/0163652 A1 | 6/2009 | Tajima et al. |
| 2011/0200939 A1 | 8/2011 | Lee et al. |
| 2014/0017501 A1* | 1/2014 | Morishita ............ C08K 5/0008 428/416 |
| 2019/0049840 A1* | 2/2019 | Konoshima ............. G06F 3/044 |

FOREIGN PATENT DOCUMENTS

| | | | |
|---|---|---|---|
| CN | 102361913 | 2/2012 | |
| JP | H04-323216 | 11/1992 | |
| JP | H05-148410 | 6/1993 | |
| JP | H05-148411 | 6/1993 | |
| JP | H09-328534 | 12/1997 | |
| JP | 2004-035821 | 2/2004 | |
| JP | 2005-105264 | 4/2005 | |
| JP | 2008-156546 | 7/2008 | |
| JP | 2009-052023 | 3/2009 | |
| JP | 2009-122478 | 6/2009 | |
| JP | 2009-167390 | 7/2009 | |
| JP | 2012-102228 | 5/2012 | |
| JP | 2012-163339 | 8/2012 | |
| JP | 2012193339 | 10/2012 | |
| TW | I341850 | 5/2011 | |
| WO | WO-2012111543 A1 * | 8/2012 | ........... H05K 1/0373 |
| WO | 2013/054868 | 4/2013 | |

OTHER PUBLICATIONS

Nagashima et al., Machine translation of JP 2009-235147. Oct. 15, 2009.*
Fukumura et al., Machine translation of JP 2005-105264. Apr. 21, 2005.*
Shiobara et al., JP 05-148411 A machine translation in English, Jun. 15, 1993 (Year: 1993).*
Ishihara et al., JP 04-323216 A machine translation in English, Nov. 12, 1992 (Year: 1992).*
Chemsrc, https://www.chemsrc.com/en/cas/47758-37-2_122136.html#ebiemingDiv, Jan. 9, 2020 (Year: 2020).*
"Office Action of Japan Counterpart Application," dated May 15, 2018, with English translation thereof, p. 1-p. 4.
"Office Action of China Counterpart Application" with machine English translation thereof, dated Oct. 24, 2016, p. 1-p. 18, in which the listed references were cited.
"International Search Report (Form PCT/ISA/210) of PCT/JP2014/069722", dated Oct. 28, 2014, with English translation thereof, pp. 1-4.

* cited by examiner

*Primary Examiner* — David T Karst
(74) *Attorney, Agent, or Firm* — JCIPRNET

(57) ABSTRACT

The invention concerns a thermosetting resin composition, a cured film, a substrate with the cured film, and an electronic component, and the thermosetting resin composition contains polyester amide acid (A), epoxy compound (B) having a fluorene skeleton and epoxy curing agent (C).

20 Claims, No Drawings

THERMOSETTING RESIN COMPOSITION, CURED FILM, SUBSTRATE WITH CURED FILM, AND ELECTRONIC COMPONENT

CROSS-REFERENCE TO RELATED APPLICATION

This application is a 371 application of the International PCT application serial no. PCT/JP2014/069722, filed on Jul. 25, 2014, which claims the priority benefit of Japan application no. 2013-154880, filed on Jul. 25, 2013. The entirety of each of the abovementioned patent applications is hereby incorporated by reference herein and made a part of this specification.

TECHNICAL FIELD

The invention relates to a thermosetting resin composition, a cured film, a substrate with the cured film, and an electronic component. More specifically, the invention relates to a thermosetting resin composition containing a specific compound, a cured film made from the composition, a substrate with the cured film in which the substrate has the cured film, and an electronic component having the cured film or the substrate with the cured film.

BACKGROUND ART

A touch panel type input device in which a liquid crystal display device or an organic electroluminescence device is combined with a position detecting device has recently spread as an input device. The touch panel type input device is the input device in which, upon allowing a tip of a finger or a pen to bring into contact onto a display screen, a contact position thereon is detected. The touch panel type input device includes various detecting systems such as a resistance film system and a capacitive system.

For example, the capacitive system is of a system for detecting as a current change a capacitance change caused by contact of a fingertip or the like by using a device having a structure in which X and Y electrodes are arranged in matrix and are arranged on a glass substrate.

Upon forming the electrodes, a jumper is formed using ITO (indium tin oxide) or the like on overlap portions of the X and Y electrodes, in order to recognize an X-position and a Y-position, and a transparent insulating film is provided so as to avoid mutual contact of the X and Y electrodes. The transparent insulating film is required to satisfy a certain grade of hardness, high transparency, adhesion to glass or ITO, resistance to an ITO etching solution containing oxalic acid or the like that may be used upon forming the X and Y electrodes.

Moreover, an insulating overcoat is provided for the capacitive system touch panel in several cases, for example, in order to provide flattening over surfaces of the X and Y electrodes, or the like. The overcoat is required to satisfy degassing prevention, a certain grade of hardness, high transparency, and adhesion to glass or ITO, in addition to the flatness.

With regard to a high transparent insulation material that can be used in such a transparent insulating film or overcoat, various compositions have been examined so far.

For example, Patent literature No. 1 and Patent literature No. 2 disclose a resin composition containing a polyester amide acid having a specific structure, an epoxy resin, an epoxy curing agent and the like. However, no study has been made on adhesion of a cured film to be obtained from the composition to an ITO substrate, and resistance thereof to the ITO etching solution containing oxalic acid in all of the Patent literature.

Patent literature No. 3 discloses a curable composition containing an epoxy compound having a fluorene skeleton and a curing agent. However, no study has been made on transparency of a cured film to be obtained from the composition, adhesion thereof to glass or ITO and resistance thereof to the ITO etching solution containing oxalic acid in Patent literature No. 3.

CITATION LIST

Patent Literature

Patent literature No. 1: JP 2005-105264 A
Patent literature No. 2: JP 2008-156546 A
Patent literature No. 3: JP 2012-102228 A

SUMMARY OF INVENTION

Technical Problem

In view of line simplification, improvement in a yield or the like upon manufacturing a touch panel type input device, a resin composition that can be used for any one of a transparent insulating film and an overcoat is considered to be desirable. However, such a resin composition has not been realized yet.

The invention provides a thermosetting resin composition that can faun a cured film excellent and well balanced in hardness, high transparency, adhesion to glass and ITO and resistance to an ITO etching solution containing oxalic acid, and to provide an application thereof.

Solution to Problem

The present inventors have diligently continued to conduct study in order to solve the problem described above.

For example, when a resin composition specifically described in the above Patent literature is studied, a cured film obtained from the composition has been poor in adhesion to glass or ITO, particularly to ITO.

The present inventors have studied in various manners based on the findings, and as a result, have found that the problem can be solved by a thermosetting resin composition having a constitution below, and have completed the invention.

More specifically, the invention concerns items 1 to 21 below.

Item 1. A thermosetting resin composition containing polyester amide acid (A), epoxy compound (B) having a fluorene skeleton and epoxy curing agent (C).

Item 2. The thermosetting resin composition according to item 1, wherein an epoxy equivalent of epoxy compound (B) is 200 to 550 g/eq.

Item 3. The thermosetting resin composition according to item 1 or 2, containing 1 to 380 parts by weight of epoxy curing agent (C) based on 100 parts by weight in a total amount of epoxy compounds having two or more oxirane rings or oxetane rings in a molecule in the thermosetting resin composition.

Item 4. The thermosetting resin composition according to any one of items 1 to 3, containing 10 to 400 parts by weight of epoxy compound (B) based on 100 parts by weight of polyester amide acid (A).

Item 5. The thermosetting resin composition according to any one of items 1 to 4, wherein epoxy curing agent (C) is an acid anhydride curing agent.

Item 6. The thermosetting resin composition according to any one of items 1 to 5, wherein, a weight average molecular weight of polyester amide acid (A) is 2,000 to 30,000.

Item 7. The thermosetting resin composition according to any one of items 1 to 6, wherein polyester amide acid (A) is a compound having a constitutional unit represented by formulas (3) and (4).

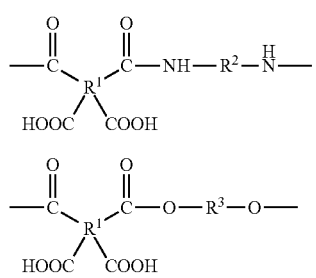

(wherein, $R^1$ is independently a tetravalent organic group having 1 to 30 carbons, $R^2$ is a divalent organic group having 1 to 40 carbons and $R^3$ is a divalent organic group having 1 to 20 carbons.)

Item 8. The thermosetting resin composition according to any one of items 1 to 7, wherein polyester amide acid (A) is a compound obtained from reaction between a component containing tetracarboxylic dianhydride (a1), a component containing diamine (a2) and a component containing polyhydric hydroxy compound (a3).

Item 9. The thermosetting resin composition according to any one of items 1 to 8, wherein polyester amide acid (A) is a compound obtained from reaction between a component containing tetracarboxylic dianhydride (a1), a component containing diamine (a2), a component containing polyhydric hydroxy compound (a3) and a component containing monohydric alcohol (a4).

Item 10. The thermosetting resin composition according to any one of items 1 to 9, wherein polyester amide acid (A) is a compound obtained from reaction between X mol of tetracarboxylic dianhydride (a1), Y mol of diamine (a2) and Z mol of polyhydric hydroxy compound (a3) at such a ratio of satisfying a relationship represented by formula (1) and formula (2):

$$0.2 \leq Z/Y \leq 8.0 \quad (1)$$

$$0.2 \leq (Y+Z)/X \leq 1.5 \quad (2).$$

Item. 11. The thermosetting resin composition according to any one of items 8 to 10, wherein tetracarboxylic dianhydride (a1) includes one or more kinds of compounds selected from the group of 3,3',4,4'-diphenylsulfone tetracarboxylic dianhydride, 3,3',4,4'-diphenyl ether tetracarboxylic dianhydride, 2,2-(bis(3,4-dicarboxyphenyl)hexafluoropropane dianhydride and ethyleneglycol bis(anhydrotrimellitate).

Item 12. The thermosetting resin composition according to any one of items 8 to 11, wherein diamine (a2) includes one or more kinds of compounds selected from the group of 3,3'-diaminodiphenyl sulfone and bis[4-(3-aminophenoxy)phenyl]sulfone.

Item 13. The thermosetting resin composition according to any one of items 8 to 12, wherein polyhydric hydroxy compound (a3) includes one or more kinds of compounds selected from the group of ethylene glycol, propylene glycol, 1,4-butanediol, 1,5-pentanediol, 1,6-hexanediol, 1,7-heptanediol and 1,8-octanediol.

Item 14. The thermosetting resin composition according to any one of items 9 to 13, wherein monohydric alcohol (a4) includes one or more kinds of compounds selected from the group of isopropyl alcohol, allyl alcohol, benzyl alcohol, hydroxyethyl methacrylate, propylene glycol monoethyl ether and 3-ethyl-3-hydroxymethyloxetane.

Item 15. The thermosetting resin composition according to any one of items 8 to 14, wherein tetracarboxylic dianhydride (a1) is 3,3',4,4'-diphenyl ether tetracarboxylic dianhydride, diamine (a2) is 3,3'-diaminodiphenyl sulfone, polyhydric hydroxy compound (a3) is 1,4-butanediol and epoxy curing agent (C) is trimellitic anhydride.

Item 16. The thermosetting resin composition according to any one of items 1 to 15, further containing solvent (D).

Item 17. The thermosetting resin composition according to any one of items 1 to 16, being for a touch panel use.

Item 18. A cured film obtained from the thermosetting resin composition according to any one of items 1 to 17.

Item 19. A substrate with a cured film, having the cured film according to item 18.

Item 20. An electronic component having the cured film according to item 18 or the substrate with the cured film according to item 19.

Item 21. The electronic component according to item 20, being a touch panel.

Advantageous Effects of Invention

According to the invention, a cured film can be formed, the cured film having a certain degree of hardness, high transparency, adhesion to glass and ITO and resistance to an ITO etching solution containing oxalic acid, and particularly having the effects with a good balance. Accordingly, the thermosetting resin composition of the invention has significantly high practicability, and can produce, for example, a transparent insulating film and an overcoat for a touch panel with excellent productivity, and thus can be preferably used in the applications.

DESCRIPTION OF EMBODIMENTS

A thermosetting resin composition of the invention (hereafter, also referred to as "composition of the invention"), a method of preparation of the composition, a method of formation of a cured film, a substrate with the cured film and an electronic component will be described in detail below.

1. Thermosetting Resin Composition

A composition of the invention contains polyester amide acid (A), epoxy compound (B) having a fluorene skeleton and epoxy curing agent (C). The composition of the invention may contain an additive in addition to the above components, and may be colored or colorless.

According to the composition of the invention, a cured film excellent and well balanced in hardness, high transparency, adhesion to glass and ITO, and resistance to an ITO etching solution containing oxalic acid can be obtained. Therefore, according to the composition of the invention, a transparent insulating film and an overcoat for a touch panel can be formed with excellent productivity. Accordingly, the composition of the invention can be preferably used in the above applications.

Only when the composition of the invention contains polyester amide acid (A), epoxy compound (B) having a fluorene skeleton and epoxy curing agent (C), a cured film excellent in the above effects, particularly in adhesion to glass, ITO and the like can be obtained.

When a conventional composition composed of polyester amide acid, or a conventional composition composed of an epoxy compound having a fluorene skeleton and an epoxy curing agent is used, no cured film excellent in adhesion to the substrates, particularly to ITO have been obtained.

Accordingly, the composition of the invention has an effect that is unforeseeable from the conventional composition, and a synergistic effect with regard to the conventional composition composed of polyester amide acid, or the conventional composition composed of the epoxy compound having the fluorene skeleton and the epoxy curing agent.

1.1. Polyester Amide Acid (A)

Polyester amide acid (A) used in the invention is not particularly restricted, but is preferably a compound having an ester bond, an amide bond and a carboxyl group, and specifically, further preferably a compound having a constitutional unit represented by formulas (3) and (4).

Only when such polyester amide acid (A) is used in combination with a specific epoxy compound and a specific epoxy curing agent, a composition that can form a cured film is obtained, in which the cured film is excellent and well balanced in hardness, high transparency and resistance to an ITO etching solution containing oxalic acid, and further excellent in adhesion to glass and ITO.

Polyester amide acid (A) may be used in one kind or two or more kinds.

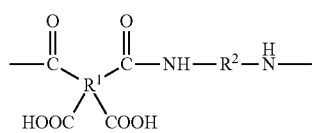

(3)

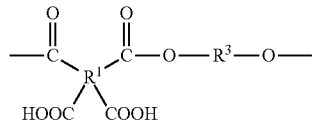

(4)

(wherein, $R^1$ is independently a tetravalent organic group having 1 to 30 carbons, $R^2$ is a divalent organic group having 1 to 40 carbons, and $R^3$ is a divalent organic group having 1 to 20 carbons.)

In view of obtaining a compound having excellent compatibility with other components in the composition, a cured film having high transparency, and the like, $R^1$ is independently preferably a tetravalent organic group having 2 to 25 carbons, further preferably a tetravalent organic group having 2 to 20 carbons, and still further preferably a group represented by formula (5).

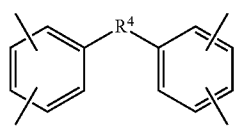

(5)

(wherein, in formula (5), $R^4$ is —O—, —CO—, —SO$_2$—, —C(CF$_3$)$_2$—, —R$^5$—, or —COO—R$^5$—OCO— ($R^5$ is independently an alkyl group having 1 to 4 carbons).)

In view of obtaining the compound having excellent compatibility with other components in the composition, a cured film having high transparency and excellent adhesion to glass and ITO, and the like, $R^2$ is preferably a divalent organic group having 2 to 35 carbons, further preferably a divalent organic group having 2 to 30 carbons, and still further preferably a group represented by formula (6).

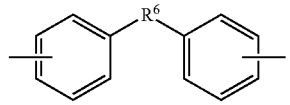

(6)

(wherein, in formula (6), $R^6$ is —O—, —CO—, —SO$_2$—, —C(CF$_3$)$_2$—, —R$^7$— or —O-ph-R$^8$-ph-O— (ph is a benzene ring, $R^8$ is —O—, —CO—, —SO$_2$—, —C(CF$_3$)$_2$— or —R$^7$—). In addition, $R^7$ is independently an alkyl group having 1 to 4 carbons.)

In view of obtaining a cured film having high transparency, and the like, $R^3$ is preferably a divalent organic group having 2 to 15 carbons, further preferably a group represented by formula (7), —R$^{10}$—NR$^{11}$—R$^{12}$— ($R^{10}$ and $R^{12}$ are independently alkylene having 1 to 8 carbons, and $R^{11}$ is hydrogen or alkyl having 1 to 8 carbons in which at least one of hydrogen may be replaced by hydroxyl), alkylene having 2 to 15 carbons, or a group in which at least one of hydrogen of alkylene having 2 to 15 carbons may be replaced by hydroxyl or a group in which alkylene having 2 to 15 carbons may have —O—, and still further preferably a divalent alkylene having 2 to 6 carbons.

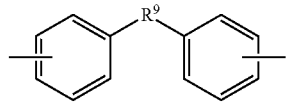

(7)

(wherein, in formula (7), $R^9$ is —O—, —CO—, —SO$_2$—, —C(CF$_3$)$_2$—, —R$^7$— or -ph-R$^8$-ph- (ph is a benzene ring, $R^8$ is —O—, —CO—, —SO$_2$—, —C(CF$_3$)$_2$— or —R$^7$—). In addition, $R^7$ is independently an alkyl group having 1 to 4 carbons.)

Polyester amide acid (A) is preferably a compound obtained from reaction between a component containing tetracarboxylic dianhydride (a1), a component containing diamine (a2) and a component containing polyhydric hydroxy compound (a3), and also a compound obtained from reaction between the component containing tetracarboxylic dianhydride (a1), the component containing diamine (a2), the component containing the polyhydric hydroxy compound (a3), and a component containing monohydric alcohol (a4).

In the formulas (3) and (4), $R^1$ is independently preferably a tetracarboxylic dianhydride residue, $R^2$ is preferably a diamine residue and $R^3$ is preferably a polyhydric hydroxy compound residue.

In addition, reaction solvent (a5) or the like may be used upon the above reaction.

The component containing tetracarboxylic dianhydride (a1) needs to contain tetracarboxylic dianhydride (a1), and may contain any other compound than tetracarboxylic dianhydride (a1). A same rule applies to any other component described above.

The above (a1) to (a5) may be used in one kind or two or more kinds.

In the case where polyester amide acid (A) has an acid anhydride group at a terminal of a molecule, polyester amide acid (A) is preferably a compound prepared by allowing the acid (A) to react with monohydric alcohol (a4) when necessary. Polyester amide acid (A) obtained by using monohydric alcohol (a4) tends to be a compound excellent in compatibility with epoxy compound (B) and epoxy curing agent (C), and tends to give a composition excellent in coating property.

1.1.1. Tetracarboxylic Dianhydride (a1)

Tetracarboxylic dianhydride (a1) is not particularly restricted, and the specific examples include aromatic tetracarboxylic dianhydride such as 3,3',4,4'-benzophenone tetracarboxylic dianhydride, 2,2',3,3'-benzophenone tetracarboxylic dianhydride, 2,3,3',4'-benzophenone tetracarboxylic dianhydride, 3,3',4,4'-diphenylsulfone tetracarboxylic dianhydride, 2,2',3,3'-diphenylsulfone tetracarboxylic dianhydride, 2,3,3',4'-diphenylsulfone tetracarboxylic dianhydride, 3,3',4,4'-diphenyl ether tetracarboxylic dianhydride, 2,2',3,3'-diphenyl ether tetracarboxylic dianhydride, 2,3,3',4'-diphenyl ether tetracarboxylic dianhydride, 2,2-[bis(3,4-dicarboxyphenyl]hexafluoropropane dianhydride, and ethyleneglycol bis(anhydrotrimellitate) (trade name: TMEG-100, made by New Japan Chemical Co., Ltd.); alicyclic tetracarboxylic dianhydride such as cyclobutane tetracarboxylic dianhydride, methylcyclobutane tetracarboxylic dianhydride, cyclopentane tetracarboxylic dianhydride, and cyclohexane tetracarboxylic dianhydride; and aliphatic tetracarboxylic dianhydride such as ethane tetracarboxylic dianhydride, and butane tetracarboxylic dianhydride.

In view of obtaining the compound excellent in transparency and the like, among the above compounds, 3,3',4,4'-diphenylsulfone tetracarboxylic dianhydride, 3,3',4,4'-diphenyl ether tetracarboxylic dianhydride, 2,2-[bis(3,4-dicarboxyphenyl]hexafluoropropane dianhydride and ethyleneglycol bis(anhydrotrimellitate) (trade name: TMEG-100, made by New Japan Chemical Co., Ltd.) are preferred, and 3,3',4,4'-diphenyl ether tetracarboxylic dianhydride and 3,3',4,4'-diphenylsulfone tetracarboxylic dianhydride are particularly preferred.

1.1.2. Diamine (a2)

Diamine (a2) is not particularly restricted, and specific examples include 4,4'-diaminodiphenyl sulfone, 3,3'-diaminodiphenyl sulfone, 3,4'-diaminodiphenyl sulfone, bis[4-(4-aminophenoxy)phenyl]sulfone, bis[4-(3-aminophenoxy)phenyl]sulfone, bis[3-(4-aminophenoxy)phenyl]sulfone, [4-(4-aminophenoxy)phenyl] [3-(4-aminophenoxy)phenyl]sulfone, [4-(3-aminophenoxy)phenyl][3-(4-aminophenoxy)phenyl]sulfone and 2,2-bis[4-(4-aminophenoxy)phenyl]hexafluoropropane.

In view of obtaining the compound excellent in transparency and the like, among the above compounds, 3,3'-diaminodiphenyl sulfone and bis[4-(3-aminophenoxy)phenyl]sulfone are preferred, and 3,3'-diaminodiphenyl sulfone is particularly preferred.

1.1.3. Polyhydric Hydroxy Compound (a3)

Polyhydric hydroxy compound (a3) is not particularly restricted, as long as the compound has two or more hydroxy groups, and specific examples include ethylene glycol, diethylene glycol, triethylene glycol, tetraethylene glycol, polyethyleneglycol having a molecular weight of 1,000 or less, propylene glycol, dipropylene glycol, tripropylene glycol, tetrapropylene glycol, polypropylene glycol having a molecular weight of 1,000 or less, 1,2-butanediol, 1,3-butanediol, 1,4-butanediol, 1,2-pentanediol, 1,5-pentanediol, 2,4-pentanediol, 1,2,5-pentanetriol, 1,2-hexanediol, 1,6-hexanediol, 2,5-hexanediol, 1,2,6-hexanetriol, 1,2-heptanediol, 1,7-heptanediol, 1,2,7-heptanetriol, 1,2-octanediol, 1,8-octanediol, 3,6-octanediol, 1,2,8-octanetriol, 1,2-nonanediol, 1,9-nonanediol, 1,2,9-nonanetriol, 1,2-decanediol, 1,10-decanediol, 1,2,10-decanetriol, 1,2-dodecanediol, 1,12-dodecanediol, glycerol, trimethylolpropane, pentaerythritol, dipentaerythritol, bisphenol A, bisphenol S, bisphenol F, diethanolamine and triethanolamine.

Among the above compounds, ethylene glycol, propylene glycol, 1,4-butanediol, 1,5-pentanediol, 1,6-hexanediol, 1,7-heptanediol and 1,8-octanediol are preferred, and 1,4-butanediol, 1,5-pentanediol and 1,6-hexanediol are particularly preferred, in view of being excellent in solubility in reaction solvent (a5), and the like.

1.1.4. Monohydric Alcohol (a4)

Monohydric alcohol (a4) is not particularly restricted, as long as the compound has one hydroxy group, and specific examples include methanol, ethanol, 1-propanol, isopropyl alcohol, allyl alcohol, benzyl alcohol, hydroxyethyl methacrylate, propylene glycol monoethyl ether, propylene glycol monomethyl ether, dipropylene glycol monoethyl ether, dipropylene glycol monomethyl ether, ethylene glycol monoethyl ether, ethylene glycol monomethyl ether, diethylene glycol monoethyl ether, diethylene glycol monomethyl ether, phenol, borneol, maltol, linalool, terpineol, dimethylbenzyl carbinol, and 3-ethyl-3-hydroxymethyloxetane.

Among the above compounds, isopropyl alcohol, allyl alcohol, benzyl alcohol, hydroxyethyl methacrylate, propylene glycol monoethyl ether and 3-ethyl-3-hydroxymethyloxetane are preferred. When taking into consideration compatibility of the resulting polyester amide acid (A) with epoxy compound (B) and epoxy curing agent (C), and coating property of the resulting composition to glass or ITO, benzyl alcohol is further preferred as monohydric alcohol (a4).

1.1.5. Reaction Solvent (a5)

Reaction solvent (a5) is not particularly restricted, and specific examples include diethylene glycol dimethyl ether, diethylene glycol diethyl ether, diethylene glycol methyl ethyl ether, diethylene glycol monoethyl ether acetate, triethylene glycol dimethyl ether, ethylene glycol monoethyl ether acetate, propylene glycol monomethyl ether acetate, methyl 3-methoxypropionate, ethyl 3-ethoxy propionate, ethyl lactate, cyclohexanone, N-methyl-2-pyrrolidone, and N,N-dimethylacetamide.

In view of solubility, among the above compounds, propylene glycol monomethyl ether acetate, diethylene glycol methyl ethyl ether, triethylene glycol dimethyl ether, methyl 3-methoxypropionate, and N-methyl-2-pyrrolidone are preferred.

In addition, specific examples of reaction solvent (a5) include the above solvents. However, a mixed solvent in which any other solvent than the above solvents is mixed with the solvents can also be used, if a ratio of the solvent other than the above solvents is 30% by weight or less based on a total amount of solvents used in the above reaction.

Synthesis of Polyester Amide Acid (A)

A method of synthesis of polyester amide acid (A) is not particularly restricted. However, a method of allowing tetracarboxylic dianhydride (a1) to react with diamine (a2), polyhydric hydroxy compound (a3), and when necessary monohydric alcohol (a4) as an essential component is preferred, and a method of performing the reaction in reaction solvent (a5) is further preferred.

An order of addition of each component upon the above reaction is not particularly concerned. More specifically, tetracarboxylic dianhydride (a1), diamine (a2) and polyhydric hydroxy compound (a3) may be simultaneously added to reaction solvent (a5); diamine (a2) and polyhydric hydroxy compound (a3) may be dissolved into reaction solvent (a5) and then tetracarboxylic dianhydride (a1) may be added thereto to allow reaction thereamong; or tetracarboxylic dianhydride (a1) may be allowed to react with diamine (a2) beforehand, and then polyhydric hydroxy compound (a3) may be added to the resulting reaction product to allow reaction thereamong; and any method may be applied.

In addition, alcohol (a4) may be added at any time point of the reaction.

Upon the above reaction, the synthesis reaction may be performed by adding a compound having three or more acid anhydride groups thereto in order to increase the weight average molecular weight of polyester amide acid (A) to be obtained. Specific examples of the compound having three or more acid anhydride groups include a styrene-maleic anhydride copolymer.

The thus synthesized polyester amide acid includes the constitutional unit represented by the formulas (3) and (4), and a terminal thereof is an acid anhydride group, an amino group or a hydroxy group respectively derived from the tetracarboxylic dianhydride and the diamine or the polyhydric hydroxy compound, each being the raw material, or a group derived from the component other than the compounds (for example, a monohydric alcohol residue).

When amounts of use of tetracarboxylic dianhydride (a1), diamine (a2) and polyhydric hydroxy compound (a3) upon the above reaction is taken as X mole, Y mole and Z mole, respectively, the relationship in formula (1) and formula (2) is preferably satisfied among X, Y and Z. When each component is used in such an amount, polyester amide acid (A) having high solubility in solvent (D) described below can be obtained, and a composition excellent in coating property can be obtained, and a cured film excellent in flatness can be obtained.

$$0.2 \leq Z/Y \leq 8.0 \quad (1)$$

$$0.2 \leq (Y+Z)/X \leq 1.5 \quad (2).$$

Then, the relationship in formula (1) satisfies preferably an expression: $0.7 \leq Z/Y \leq 7.0$, and further preferably an expression: $1.3 \leq Z/Y \leq 7.0$. The relationship in formula (2) satisfies preferably an expression: $0.3 \leq (Y+Z)/X \leq 1.2$, and further preferably an expression: $0.4 \leq (Y+Z)/X \leq 1.0$.

When an amount of use of monohydric alcohol (a4) upon the above reaction is taken as Z' mole, the amount of use is not particularly restricted, but satisfies preferably an expression: $0.1 \leq Z'/X \leq 5.0$, and further preferably an expression: $0.2 \leq Z'/X \leq 4.0$.

When 100 parts by weight or more of reaction solvent (a5) are used based on 100 parts by weight of the total amount of tetracarboxylic dianhydride (a1), diamine (a2) and polyhydric hydroxy compound (a3), the reaction smoothly progresses, and therefore such a case is preferred.

The above reaction is preferably performed at 40 to 200° C. for 0.2 to 20 hours.

Properties, Amount of Use and so Forth of Polyester Amide Acid (A)

From viewpoints of solubility insolvent (D) and obtaining a cured film well balanced in transparency, adhesion to glass or ITO and chemical resistance by particularly using polyester amide acid (A) with epoxy compound (B), the weight average molecular weight of polyester amide acid (A) measured by gel permeation chromatography (GPC) is preferably 2,000 to 30,000, and further preferably 3,000 to 30,000.

The weight average molecular weight can be specifically measured by the method described in Examples below.

In view of handling properties of polyester amide acid (A) and adjusting the weight average molecular weight to the above preferred range, viscosity (at 25° C.) of polyester amide acid (A) is preferably 5 to 200 mPa·s, further preferably 10 to 150 mPa·s, and still further preferably 15 to 100 mPa·s.

In view of obtaining a cured film having high transparence and excellent chemical resistance, and the like, a content of polyester amide acid (A) is preferably 1 to 60% by weight, further preferably 5 to 55% by weight, and still further preferably 5 to 50% by weight, based on 100% by weight of solid content (residue excluding the solvent from the composition) in the composition of the invention.

1.2. Epoxy Compound (B) Having Fluorene Skeleton

Epoxy compound (B) used in the invention is not particularly limited, as long as the compound is an epoxy compound having a fluorene skeleton. Such epoxy compound (B) has a high decomposition temperature, and is excellent in heat resistance stability, and therefore a cured film having both these effects and also the above effects such as high transparency can be obtained.

Epoxy compound (B) is ordinarily an epoxy compound having two or more oxirane rings or oxetane rings in the molecule.

Epoxy compound (B) may be used in one kind or two or more kinds.

From view of obtaining a cured film excellent in chemical resistance, and the like, an epoxy equivalent of epoxy compound (B) is preferably 200 to 550 g/eq, further preferably 220 to 490 g/eq, and still further preferably 240 to 480 g/eq.

The epoxy equivalent of epoxy compound (B) can be measured by a method described in JIS K 7236, for example.

In view of obtaining a cured film excellent in high transparency, and the like, a refractive index of epoxy compound (B) is preferably 1.50 to 1.75, further preferably 1.52 to 1.73, and still further preferably 1.54 to 1.71.

The refractive index of epoxy compound (B) can be measured by a method described in JIS K 7105 or JIS K 7142, for example.

Epoxy compound (B) may be obtained from synthesis or may be a commercial item. Examples of the commercial item of epoxy compound (B) include OGSOL PG-100 (trade name, made by Osaka Gas Chemicals Co., Ltd., refractive index: 1.64, epoxy equivalent: 259 g/eq), OGSOL CG-500 (trade name, made by Osaka Gas Chemicals Co., Ltd., refractive index: 1.70, epoxy equivalent: 311 g/eq), OGSOL EG-200 (trade name, made by Osaka Gas Chemicals Co., Ltd., refractive index: 1.62, epoxy equivalent: 292 g/eq), OGSOL EG-250 (trade name, made by Osaka Gas Chemicals Co., Ltd., refractive index: 1.58, epoxy equivalent: 417 g/eq), OGSOLEG-280 (trade name, made by Osaka Gas Chemicals Co., Ltd., refractive index: 1.56, epoxy equivalent: 467 g/eq) and OGSOL CG-400 (refractive index: 1.53, epoxy equivalent: 540 g/eq).

When a compound having a refractive index of 1.60 or more and an epoxy equivalent less than 280 g/eq, for example OGSOL PG-100 is used as epoxy compound (B), epoxy compound (B) having a refractive index of 1.70 or less and an epoxy equivalent exceeding 280 g/eq is preferably simultaneously used from viewpoints of solubility of epoxy compound (B) in other components in the composition, and the like, and in this case, a content of the compound having the refractive index of 1.60 or more and the epoxy equivalent less than 280 g/eq is preferably adjusted to 70% by weight or less, further preferably 65% by weight or less, and still further preferably 60% by weight or less, in a total of epoxy compound (B) contained in the composition of the invention.

When a compound having a refractive index of 1.68 or more and an epoxy equivalent of 400 g/eq or less, for example OGSOL CG-500 is used as epoxy compound (B), a cured film obtained from the composition of the invention is formed to have particularly high hardness. Meanwhile, transparency tends to be reduced. Therefore, a cured film excellent and well balanced in hardness and transparency can be obtained by simultaneously using epoxy compound (B) having a refractive index less than 1.68 and an epoxy equivalent of 200 g/eq or more. In this case, a content of the compound having the refractive index of 1.68 or more and the epoxy equivalent of 400 g/eq or less is preferably adjusted to 90% by weight or less, further preferably 80% by weight or less, and still further preferably 70% by weight or less, in the total of epoxy compounds (B) contained in the composition of the invention.

When a compound having a refractive index less than 1.60 and an epoxy equivalent of 300 g/eq or more, for example OGSOL EG-280 is used as epoxy compound (B), a cured film obtained from the composition of the invention is formed to have particularly good adhesion to glass and ITO, and transparency. Therefore, an amount of blending the compound having the refractive index less than 1.60 and the epoxy equivalent of 300 g/eq or more is preferably adjusted to 3% by weight or more, further preferably 5% by weight or more, and still further preferably 10% by weight or more, in the total of epoxy compound (B) contained in the composition of the invention.

In view obtaining a cured film excellent and well balanced in heat resistance, chemical resistance and adhesion to glass and ITO, and the like, a content of epoxy compound (B) is preferably 1 to 90% by weight, further preferably 3 to 80% by weight, and still further preferably 5 to 70% by weight, based on 100% by weight of solid content (residue excluding the solvent from the composition) in the composition of the invention, and preferably 10 to 400 parts by weight, further preferably 20 to 350 parts by weight, and still further preferably 30 to 300 parts by weight, based on 100 parts by weight of polyester amide acid (A).

1.3. Epoxy Curing Agent (C)

Epoxy curing agent (C) is blended in the composition of the invention. Thus, a cured film excellent in heat resistance and chemical resistance can be obtained.

Epoxy curing agent (C) is a compound different from polyester amide acid (A), and specific examples include an acid anhydride curing agent, a polyamine curing agent, a polyphenol curing agent and a catalyst type curing agent. In view of coloring resistance, heat resistance, and the like, an acid anhydride curing agent is preferred.

Epoxy curing agent (C) may be used in one kind or two or more kinds.

Specific examples of the acid anhydride curing agent include aliphatic dicarboxylic anhydride such as maleic anhydride, tetrahydrophthalic anhydride, hexahydrophthalic anhydride and methylhexahydrophthalic anhydride; aromatic polyvalent carboxylic anhydride such as phthalic anhydride and trimellitic anhydride; and a styrene-maleic anhydride copolymer. Among the compounds, trimellitic anhydride is particularly preferred in view of obtaining a compound excellent in solubility in solvent (D), and obtaining a cured film excellent in heat resistance.

In view of obtaining a cured film excellent and well balanced in hardness, chemical resistance to a chemical such as an oxalic acid aqueous solution, and adhesion to glass and ITO, and the like, a content of epoxy curing agent (C) is preferably 0.1 to 50% by weight, further preferably 0.2 to 50% by weight, and still further preferably 0.3 to 45% by weight, based on 100% by weight of solid content (residue excluding the solvent from the composition) in the composition of the invention, and preferably 1 to 380 parts by weight, further preferably 3 to 350 parts by weight, and still further preferably 5 to 150 parts by weight, based on 100 parts by weight in a total amount of an epoxy compound having two or more oxirane rings or oxetane rings in the molecule in the composition of the invention.

In addition, the total amount of the epoxy compound having two or more oxirane rings or oxetane rings in the molecule in the composition of the invention preferably corresponds to a total amount of epoxy compound (B) and epoxy compound (e).

Moreover, with regard to a ratio of epoxy curing agent (C) to epoxy compound (B) to be used, in view of obtaining a cured film excellent in heat resistance and chemical resistance, and the like, an amount of a group that can react with the epoxy group, such as an acid anhydride group and a carboxyl group in the epoxy curing agent is preferably 0.2 to 2 fold equivalents based on an amount of the epoxy group in epoxy compound (B) to be used, and when the amount is 0.5 to 1.5 fold equivalent based thereon, the chemical resistance of the resulting cured film is further improved, and therefore such a case is further preferred. In this case, for example, when 1 equivalent of compound having one epoxy group is used as epoxy compound (B), and 1 equivalent of compound having one acid anhydride group is used as epoxy curing agent (C), an amount of epoxy curing agent (C) to epoxy compound (B) is taken as a 2 fold equivalent.

1.4. Solvent (D)

The composition of the invention can be obtained by dissolving polyester amide acid (A), epoxy compound (B) and epoxy curing agent (C) into solvent (D), for example. Accordingly, solvent (D) is preferably a solvent that can dissolve polyester amide acid (A), epoxy compound (B) and epoxy curing agent (C) thereinto. Moreover, even a solvent having no capability of dissolving polyester amide acid (A), epoxy compound (B) and epoxy curing agent (C), if used alone, can be used as solvent (D) by mixing the solvent with other solvents in several cases.

Solvent (D) may be used in one kind or two or more kinds.

Specific examples of solvent (D) include ethyl lactate, ethanol, ethylene glycol, propylene glycol, glycerol, diethylene glycol dimethyl ether, diethylene glycol diethyl ether, diethylene glycol methyl ethyl ether, diethylene glycol monoethyl ether acetate, ethylene glycol monobutyl ether, ethylene glycol monoethyl ether acetate, propylene glycol monomethyl ether acetate, methyl 3-methoxypropionate, ethyl 3-ethoxypropionate, cyclohexanone, 1,3-dioxolane, ethylene glycol dimethyl ether, 1,4-dioxane, propylene glycol dimethyl ether, propylene glycol monomethyl ether, ethylene glycol monomethyl ether, ethylene glycol monomethyl ether acetate, anisole, dipropylene glycol dimethyl ether, diethylene glycol isopropylmethyl ether, dipropylene glycol monomethyl ether, diethylene glycol monomethyl ether, diethylene glycol butyl methyl ether, triethylene glycol dimethyl ether, diethylene glycol monobutyl ether, ethylene glycol monophenyl ether, triethylene glycol monomethyl ether, diethylene glycol dibutyl ether, propylene glycol monobutyl ether, propylene glycol monoethyl ether, triethylene glycol divinyl ether, tripropylene glycol monomethyl ether, tetramethylene glycol monovinyl ether, methyl benzoate, ethyl benzoate, 1-vinyl-2-pyrrolidone, 1-butyl-2-pyrrolidone, 1-ethyl-2-pyrrolidone, 1-(2-hydroxyethyl)-2-pyrrolidone, 2-pyrrolidone, N-methyl-2-pyrrolidone, 1-acetyl-2-pyrrolidone, N,N-dimethylacetamide, N,N-diethylacetamide, N,N-dimethylpropionamide, N-methyl-ε-caprolactam, 1,3-dimethyl-2-imidazolidinone, γ-butyrolactone, α-acetyl-γ-butyrolactone, ε-caprolactone, γ-hexanolactone, δ-hexanolactone, methylethyl sulfoxide, dimethyl sulfoxide and Equamide (trade name) made by Idemitsu Kosan Co., Ltd.

Among the above solvents, in view of solubility relative to polyester amide acid (A), epoxy compound (B) and epoxy curing agent (C), the composition of the invention preferably contains as solvent (D) at least one kind selected from the group of ethylene glycol monobutyl ether, diethylene glycol monoethyl ether acetate, diethylene glycol dimethyl ether, diethylene glycol methyl ethyl ether, triethylene glycol dimethyl ether, propylene glycol monomethyl ether acetate, methyl 3-methoxypropionate, γ-butyrolactone, dimethyl sulfoxide and Equamide (trade name) made by Idemitsu Kosan Co., Ltd.

1.5. Additive

The composition of the invention may contain an additive other than polyester amide acid (A), epoxy compound (B) and epoxy curing agent (C) according to objective characteristics. Specific examples of the additive include epoxy compound (e) having two or more oxirane rings or oxetane rings in the molecule, a polyimide resin, polymerizable monomer (j), an antistatic agent, coupling agent (f), a pH adjuster, a corrosion inhibitor, an antiseptic agent, an antifungal agent, antioxidant (g), surfactant (h), epoxy curing accelerator (i), a reduction inhibitor, an evaporation accelerator, a chelating agent and a water-soluble polymer. A pigment or a dye may be incorporated thereinto according to a desired application. The additive may be used in one kind or two or more kinds.

1.5.1. Epoxy Compound (e) Containing Two or More Oxirane Rings or Oxetane Rings in Molecule In the invention, epoxy compound (e) means an epoxy compound other than epoxy compound (B).

A compound having two or more oxirane rings is preferably used as epoxy compound (e). Epoxy compound (e) may be used in one kind or two or more kinds.

Specific examples of epoxy compound (e) include a bisphenol A epoxy compound, a glycidyl ester epoxy compound, an alicyclic epoxy compound, a polymer from a monomer having an oxirane ring, and a copolymer from a monomer having an oxirane ring and any other monomer.

Specific examples of the monomer having an oxirane ring include glycidyl(meth)acrylate. 3,4-epoxycyclohexyl(meth)acrylate, methyl glycidyl(meth)acrylate and a compound represented by the structure below.

In the invention, (meth)acrylate refers to acrylate and/or methacrylate, and (meth)acrylic refers to acrylic and/or methacrylic.

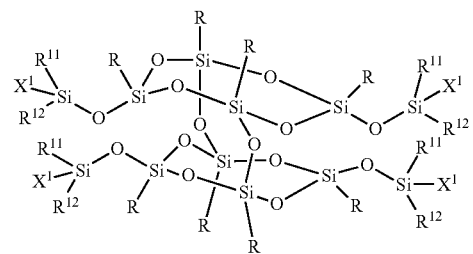

In the above formula, R is independently a group selected from alkyl having 1 to 45 carbons, cycloalkyl having 4 to 8 carbons, aryl and arylalkyl; in the alkyl having 1 to 45 carbons, at least one of hydrogen may be replaced by fluorine and nonadjacent arbitrary —$CH_2$— may be replaced by —O— or —CH=CH—; the number of carbon atoms in the alkyl in the arylalkyl is 1 to 10, and nonadjacent arbitrary —$CH_2$— in the alkyl may be replaced by —O—; $R^{11}$ and $R^{12}$ are each independently a group selected from alkyl having 1 to 4 carbons, cyclopentyl, cyclohexyl and phenyl; and $X^1$ is a group having any one of oxiranyl, oxiranylene, 3,4-epoxycyclohexyl, oxetanyl, and oxetanylene.

Specific examples of any other monomer that copolymerizes with the monomer having an oxirane ring include (meth)acrylic acid, methyl (meth)acrylate, ethyl (meth)acrylate, isopropyl (meth)acrylate, n-butyl (meth)acrylate, isobutyl (meth)acrylate, tert-butyl (meth)acrylate, cyclohexyl (meth)acrylate, benzyl (meth)acrylate, 2-hydroxyethyl (meth)acrylate, 2-hydroxypropyl (meth)acrylate, styrene, methylstyrene, chloromethylstyrene, (3-ethyl-3-oxetanyl)methyl (meth)acrylate, N-cyclohexylmaleimide and N-phenylmaleimide.

Specific preferred examples of the polymer from the monomer having an oxirane ring, and the copolymer from the monomer having an oxirane ring and any other monomer include polyglycidyl methacrylate, a copolymer of methyl methacrylate and glycidyl methacrylate, a copolymer of benzyl methacrylate and glycidyl methacrylate, a copolymer of n-butyl methacrylate and glycidyl methacrylate, a copolymer of 2-hydroxyethyl methacrylate and glycidyl methacrylate, a copolymer of (3-ethyl-3-oxetanyl)methyl methacrylate and glycidyl methacrylate, and a copolymer of styrene and glycidyl methacrylate. When the composition of the invention contains the above epoxy compounds, the heat resistance of a cured film formed from the composition is further improved, and therefore such a case is preferred.

Specific examples of the epoxy compound include "807", "815", "825", "827", "828", "828EL", "871", "872", "190P", "191P", "1001", "1004", "1004AF", "1007", "1256", "157S70", and "1032H60" (trade names for all, made by Mitsubishi Chemical Corporation), "Araldite CY177" and "Araldite CY184" (trade names for all, made by BASF SE), "Celloxide 2021P", "Celloxide 3000", "Celloxide 8000" and "EHPE-3150" (trade names for all, made by Daicel Corporation), "TECHMORE VG3101L" (trade name, made by Printec Corporation), "HP7200", "HP7200H" and "HP7200HH" (trade names for all, made by DIC Corporation), "NC-3000", "NC-3000H", "EPPN-501H", "EOCN-102S", "EOCN-103S", "EOCN-104S", "EPPN-501H", "EPPN-501HY", "EPPN-502H" and "EPPN-201-L" (trade names for all, made by Nippon Kayaku Co., Ltd.), "TEP-G" (trade name, made by Asahi Yukizai Kogyo Co., Ltd.), "MA-DGIC", "Me-DGIC" and "TG-G" (trade names for all, made by Shikoku Chemicals Corporation), "TEPIC-VL" (trade name, made by Nissan Chemical Industries, Ltd.), "FLEP-10", "FLEP-50", "FLED-60" and "FLEP-80" (trade names for all, made by Toray Thiokol Co., Ltd.), N,N,N',N'-tetraglycidyl-m-xylenediamine, 1,3-bis(N,N-diglycidylaminomethyl)cyclohexane and N,N,N',N'-tetraglycidyl-4,4'-diaminodiphenylmethane. Among the above compounds, a composition containing the trade name: "Araldite CY184", the trade name: "Celloxide 2021P", the trade name: "TECHMORE VG3101L" or the trade name: "828" is preferred because a cured film particularly good in flatness can be obtained.

A concentration of epoxy compound (e) in the composition of the invention is not particularly limited, but in view of obtaining a cured film excellent and well balanced in heat resistance and adhesion to glass and ITO, epoxy compound (e) is preferably contained in an amount of 0 to 50% by weight, further preferably in an amount of 0 to 40% by weight, in the solid content (residue excluding the solvent from the composition) in the composition of the invention.

1.5.2. Polyimide Resin

A polyimide resin is not particularly limited, as long as the resin has an imide group.

The polyimide resin may be used in one kind or two or more kinds.

The polyimide resin can be obtained by imidizing amic acid obtained by allowing acid dianhydride to react with diamine, for example. Specific examples of the acid dianhydride include tetracarboxylic dianhydride (a1) that can be used for synthesis of polyester amide acid (A). Specific examples of the diamine include diamine (a2) that can be used for synthesis of polyester amide acid (A).

When the composition of the invention contains the polyimide resin, a concentration of the polyimide resin in the composition of the invention is not particularly limited, but in view of obtaining a cured film further excellent in heat resistance and chemical resistance, and the like, the concentration is preferably 0.1 to 20% by weight, and further preferably 0.1 to 10% by weight.

1.5.3. Polymerizable Monomer (j)

Specific examples of polymerizable monomer (j) include a monofunctional polymerizable monomer, bifunctional (meth)acrylate and trifunctional or higher polyfunctional (meth)acrylate.

The polymerizable monomer may be used in one kind or two or more kinds.

When the composition of the invention contains the polymerizable monomer, a concentration of the polymerizable monomer in the composition of the invention is not particularly limited, but in view of obtaining a cured film further excellent in chemical resistance and surface hardness, the polymerizable monomer is preferably contained in an amount of 10 to 80% by weight, and further preferably in an amount of 20 to 70% by weight, in the solid content (residue excluding the solvent from the composition) in the composition of the invention.

Specific examples of the monofunctional polymerizable monomer include 2-hydroxyethyl (meth)acrylate, 2-hydroxypropyl (meth)acrylate, 4-hydroxybutyl (meth)acrylate, 1,4-cyclohexanedimethanolmono(meth)acrylate, methyl (meth)acrylate, ethyl (meth)acrylate, isopropyl (meth)acrylate, butyl (meth)acrylate, isobutyl (meth)acrylate, t-butyl (meth)acrylate, cyclohexyl (meth)acrylate, phenyl (meth)acrylate, benzyl (meth)acrylate, isobornyl (meth)acrylate, dicyclopentenyloxyethyl (meth)acrylate, tricyclo[5.2.1.0$^{2,6}$] decanyl(meth)acrylate, glycerol mono(meth)acrylate, 5-tetrahydrofurfuryloxycarbonylpentyl (meth)acrylate, (meth) acrylate of lauryl alcohol-ethylene oxide adduct, glycidyl (meth)acrylate, methylglycidyl (meth)acrylate, 3,4-epoxycyclohexyl (meth)acrylate, 3-methyl-3-(meth)acryloxymethyl oxetane, 3-ethyl-3-(meth)acryloxymethyl oxetane, 3-methyl-3-(meth)acryloxyethyl oxetane, 3-ethyl-3-(meth) acryloxyethyl oxetane, p-vinylphenyl-3-ethyloxeta-3-ylmethyl ether, 2-phenyl-3-(meth)acryloxymethyl oxetane, 2-trifluoromethyl-3-(meth)acryloxymethyl oxetane, 4-trifluoromethyl-2-(meth)acryloxymethyl oxetane, (3-ethyl-3-oxetanyl)methyl (meth)acrylate, styrene, methylstyrene, chloromethylstyrene, vinyltoluene, N-cyclohexylmaleimide, N-phenylmaleimide, (meth)acrylamide, N-acryloylmorpholine, a polystyrene macromonomer, a polymethylmethacrylate macromonomer, (meth)acrylic acid, crotonic acid, α-chloroacrylic acid, cinnamic acid, maleic acid, fumaric acid, itaconic acid, citraconic acid, mesaconic acid, ω-carboxypolycaprolactone mono(meth)acrylate, mono(2-(meth) acryloyloxyethyl)succinate, mono[2-(meth)acryloyloxyethyl]maleate, and cyclohexene-3,4-dicarboxylic acid mono [2-(meth)acryloyloxyethyl].

Specific examples of the bifunctional(meth)acrylate include bisphenol F ethylene oxide-modified di(meth)acrylate, bisphenol A ethylene oxide-modified di(meth)acrylate, isocyanurate ethylene oxide-modified di(meth)acrylate, polyethylene glycol di(meth)acrylate, polypropylene glycol di(meth)acrylate, pentaerythritol di(meth)acrylate, pentaerythritol di(meth)acrylate monostearate, 1,4-butanediol di(meth)acrylate, 1,6-hexanediol di(meth)acrylate, 1,9-nonanediol di(meth)acrylate, 1,4-cyclohexanedimethanol di(meth)acrylate, 2-n-butyl-2-ethyl-1,3-propanediol di(meth)acrylate, trimethylolpropane di(meth)acrylate, and dipentaerythritol di(meth)acrylate.

Specific examples of the trifunctional or higher polyfunctional (meth)acrylate include trimethylolpropane tri(meth) acrylate, ethylene oxide-modified trimethylolpropane tri (meth)acrylate, propylene oxide-modified trimethylolpropane tri(meth)acrylate, epichlorohydrin-modified trimethylolpropane tri(meth)acrylate, ditrimethylolpropanetetra(meth)acrylate, glycerol tri(meth)acrylate, epichlorohydrin-modified glycerol tri(meth)acrylate, diglycerol tetra(meth)acrylate, pentaerythritol tri(meth)acrylate, pentaerythritol tetra(meth)acrylate, dipentaerythritol penta (meth)acrylate, alkyl-modified dipentaerythritol penta(meth)acrylate, alkyl-modified dipentaerythritol tetra(meth) acrylate, alkyl-modified dipentaerythritol tri(meth)acrylate, dipentaerythritol hexa(meth)acrylate, caprolactone-modified dipentaerythritol hexa(meth)acrylate, ethylene oxide-modified phosphoric acid tri(meth)acrylate, tris[(meth)acryloxyethyl]isocyanurate, caprolactone-modified tris[(meth) acryloxyethyl]isocyanurate, and urethane (meth)acrylate.

1.5.4. Antistatic Agent

An antistatic agent can be used for preventing electrostatic charge in the composition of the invention, and when the composition of the invention contains the antistatic agent, the antistatic agent is preferably used in an amount of 0.01 to 1% by weight in the composition of the invention.

A publicly known antistatic agent can be used as the antistatic agent. Specific examples include metal oxide such as tin oxide, tin oxide-antimony oxide composite oxide, tin oxide-indium oxide composite oxide; and quaternary ammonium salt.

The antistatic agent may be used in one kind or two or more kinds.

1.5.5. Coupling Agent (f)

Coupling agent (f) is not particularly limited, and a publicly known coupling agent such as a silane coupling agent can be used for improving adhesion to glass or ITO, and the like. When the composition of the invention contains coupling agent (f), coupling agent (f) is preferably added and used to be 10% by weight or less based on 100% by weight of solid content (residue excluding the solvent from the composition) in the composition of the invention.

Coupling agent (f) may be used in one kind or two or more kinds.

Specific examples of the silane coupling agent include a trialkoxysilane compound and a dialkoxy silane compound. Specific examples preferably include γ-vinylpropyltrimethoxysilane, γ-vinylpropyltriethoxysilane, γ-acryloylpropylmethyldimethoxysilane, γ-acryloylpropyltrimethoxysilane, γ-acryloylpropylmethyldiethoxysilane, γ-acryloylpropyltriethoxysilane, γ-methacryloylpropylmethyldimethoxysilane, γ-methacryloylpropyltrimethoxysilane, γ-methacryloylpropylmethyldiethoxysilane, γ-methacryloylpropyltriethoxysilane, γ-glycidoxypropylmethyldimethoxysilane, γ-glycidoxypropyltrimethoxysilane, γ-glycidoxypropylmethyldietoxysilane, γ-glycidoxypropyltriethoxysilane, γ-aminopropylmethyldimethoxysilane, γ-aminopropyltrimethoxysilane, γ-aminopropylmethyldiethoxysilane, γ-aminopropyltriethoxysilane, N-aminoethyl-γ-iminopropylmethyldimethoxysilane, N-aminoethyl-γ-aminopropyltrimethoxysilane, N-aminoethyl-γ-aminopropyldiethoxysilane, N-phenyl-γ-aminopropyltrimethoxysilane, N-phenyl-γ-aminopropyltriethoxysilane, N-phenyl-γ-aminopropylmethyldimethoxysilane, N-phenyl-γ-aminopropylmethyldiethoxysilane, γ-mercaptopropylmethyldimethoxysilane, γ-mercaptopropylmethyldiethoxysilane, γ-mercaptopropyltriethoxysilane, γ-isocyanatopropylmethyldiethoxysilane and γ-isocyanatopropyltriethoxysilane.

Among the above compounds, γ-vinylpropyltrimethoxysilane, γ-acryloylpropyltrimethoxysilane, γ-methacryloylpropyltrimethoxysilane, γ-glycidoxypropyltrimethoxysilane, and γ-isocyanatopropyltriethoxysilane are particularly preferred.

1.5.6. Antioxidant (g)

When the composition of the invention contains antioxidant (g), deterioration when a cured film obtained from the composition of the invention is exposed to a high temperature or light can be prevented. When the composition of the invention contains antioxidant (g), antioxidant (g) is preferably added an used in an amount of 0.1 to 3 parts by weight based on 100 parts by weight of solid content (residue excluding the solvent from the composition) in the composition excluding antioxidant (g).

Antioxidant (g) may be used in one kind or two or more kinds.

Specific examples of antioxidant (g) include a hindered amine compound and a hindered phenol compound. Specific examples include IRGAFOS XP40, IRGAFOS XP60, IRGANOX 1010, IRGANOX 1035, IRGANOX 1076, IRGANOX 1135 and IRGANOX 1520L (trade names for all, made by BASF SE).

1.5.7. Surfactant (h)

When the composition of the invention contains surfactant (h), a composition improved in wettability, levelability and applicability to a base substrate can be obtained. When the composition of the invention contains surfactant (h), surfactant (h) is preferably used to be an amount of 0.01 to 1% by weight based on 100% by weight of the composition of the invention.

Surfactant (h) may be used in one kind or two or more kinds.

In view of capability of improving applicability of the composition of the invention, and the like, specific examples of surfactant (h) include a silicon surfactant such as, in terms of trade names, "BYK-300", "BYK-306", "BYK-335", "BYK-310", "BYK-341", "BYK-344", and "BYK-370" (for all, made by BYK Japan KK) and "KP-112", "KP-326", and "KP-341" (for all, made by Shin-Etsu Chemical Co., Ltd.); an acryl surfactant such as, in terms of trade names, "BYK-354", "BYK-358" and "BYK-361" (for all, made by BYK Japan KK); and a fluorine surfactant such as, in terms of trade names, "DFX-18", "Ftergent 250", and "Ftergent 251" (for all, made by NEOS COMPANY LIMITED).

1.5.8. Epoxy Curing Accelerator (i)

In view of capability of decreasing a temperature or shortening a period of time of curing the composition of the invention, and the like, specific examples of epoxy curing accelerator (i) include "DBU", "DBN", "U-CAT", "U-CAT SA1", "U-CAT SA102", "U-CAT SA506", "U-CAT SA603", "U-CAT SA810", "U-CAT5002", "U-CAT 5003", "U-CAT 18X", "U-CAT SA 841-851", "U-CAT SA881", and "U-CAT 891" (trade names for all, made by San Apro Ltd.) and "CP-001" and "NV-203-R4" (trade names for all, made by Osaka Gas Chemicals Co., Ltd.).

Epoxy curing accelerator (i) may be used in one kind of two or more kinds, respectively.

A content of epoxy curing accelerator (i) is preferably 10 to 200% by weight, further preferably 20 to 180% by weight, and still further preferably 30 to 150% by weight, based on 100% by weight of epoxy curing agent (C).

1.5.9. Pigment or Dye

Specific examples of the pigment include one or more kinds of compounds selected from the group of silicon carbide, alumina, magnesia, silica, zinc oxide and graphite.

Specific examples of the dye include an azo dye, an azomethine dye, a xanthene dye and a quinone dye. Specific examples of the azo dye include "VALIFAST BLACK 3810", "VALIFAST BLACK 3820", "VALIFAST RED 3304", "VALIFAST RED 3320" and "OIL BLACK 860" (trade names for all, made by Orient Chemical industry).

The pigment and the dye may be used in one kind or two or more kinds, respectively.

2. Method of Preparation of Thermosetting Resin Composition

The composition of the invention can be prepared by mixing polyester amide acid (A), epoxy compound (B) and epoxy curing agent (C), and when necessary solvent (D), any other additive or the like.

Moreover, the composition of the invention can also be prepared by mixing a reaction mixture or mixed liquid obtained during synthesis of polyester amide acid (A) as it is, and epoxy compound (B), epoxy curing agent (C), and solvent (D), any other additive or the like to be used when necessary.

3. Method of Formation of Cured Film

The cured film of the invention is not particularly restricted, as long as the cured film is a film obtained from the composition of the invention. The cured film of the invention can be obtained by applying the composition of the invention onto a substrate and heating the composition applied on the substrate, for example.

An application method and a curing method for the composition of the invention will be described below.

3.1. Method of Application of Thermosetting Resin Composition

Application of the composition of the invention onto the substrate can be performed by a hitherto-known method such as a spray coating method, a spin coating method, a roll coating method, a dipping method, a slit coating method, a bar coating method, a gravure printing method, a flexography method, an offset printing, a dispenser method, a screen printing and an inkjet printing method.

For example, when the transparent insulating film provided so as to avoid contact of the X and Y electrodes is formed from the composition of the invention, in view of ease of pattern formation, a printing method such as a gravure printing method, a flexography method, an offset printing method, a dispenser method, a screen printing and an ink jet printing method is preferred.

For example, when the overcoat is formed from the composition of the invention, in view of ease of overall printing, an application method such as a spin coating method, a slit coating method, a gravure printing method, a flexography method, an offset printing, a dispenser method and a screen printing is preferred.

The substrate is not particularly limited, and a publicly-known substrate can be used. Specific examples include a glass epoxy substrate, a glass composite substrate, a paper phenol substrate, a paper epoxy substrate, a green epoxy substrate and a BT (bismaleimide triazine) resin substrate, each in conformity with a various standard such as FR-1, FR-3, FR-4, CEM-3 and E668; a substrate made of metal such as copper, brass, phosphor bronze, beryllium copper, aluminum, gold, silver, nickel, tin, chromium or stainless steel (the substrate may be a substrate having a layer made of the metal on a surface thereof); a substrate made of an inorganic substance such as indium tin oxide (ITO), aluminum oxide (alumina), aluminum nitride, zirconium oxide (zirconia), silicate of zirconium (zircon), magnesium oxide (magnesia), aluminum titanate, barium titanate, lead titanate (PT), lead zirconate titanate (PZT), lead lanthanum zirconate titanate (PLZT), lithium niobate, lithium tantalate, cadmium sulfide, molybdenum sulfide, beryllium oxide (beryllia), silicon oxide (silica), silicon carbide, silicon nitride, boron nitride, zinc oxide, mullite, ferrite, steatite, forsterite, spinel or spodumene (the substrate may be a substrate having a layer containing the inorganic substance on a surface thereof); a substrate made of a resin such as PET (polyethylene terephthalate), PEN (polyethylene naphthalate), PBT (polybutylene terephthalate), PCT (polycyclohexylenedimethylene terephthalate), PPS (polyphenylene sulfide), polycarbonate, polyacetal, polyphenylene ether, polyimide, polyamide, polyarylate, polysulfone, polyether sulfone, polyether imide, polyamideimide, an epoxy resin, an acrylic resin, Teflon (registered trademark), a thermoplastic elastomer and a liquid crystal polymer (the substrate may be a substrate having a layer containing the resin on a surface thereof); a semiconductor substrate made of such as silicon, germanium, and gallium arsenide; a glass substrate; a substrate having an electrode material (interconnection) such as tin oxide, zinc oxide, ITO and ATO (antimony tin oxide) formed on a surface thereof; and a gel sheet such as α GEL, β GEL, θ GEL or γ GEL (registered trademarks for all, made by Taica Corporation).

The composition of the invention is preferably applied onto the glass substrate, the ITO substrate and the resin-made film substrate.

3.2. Method of Curing of Thermosetting Resin Composition

The cured film can be obtained by applying the composition of the invention onto a substrate, and then heating the composition applied on the substrate. As a method for forming the cured film in the above way, a method is preferably applied in which the composition of the invention is applied on the substrate, and then the solvent is removed by allowing evaporation by heating using a hot plate, an oven or the like (drying treatment), and then the resulting film is further heated (curing treatment).

Conditions in the drying treatment are different depending upon a kind and a blending ratio of each component contained in the composition used. A heating temperature is ordinarily 70 to 120° C. and a heating time is for 5 to 15 minutes in the oven or for 1 to 10 minutes on the hot plate. A coating film at a degree of keeping the shape can be formed on the substrate by such drying treatment.

After the coating film is formed, the curing treatment is applied thereto ordinarily at 80 to 300° C., and preferably at 100 to 250° C. On the above occasion, the cured film can be obtained by applying the heat treatment ordinarily for 10 to 120 minutes when the oven is used, or for 5 to 30 minutes when the hot plate is used.

In addition, the curing treatment is not limited to the heat treatment, and treatment by ultraviolet light, ion beams, electron beams or a gamma-ray irradiation may also be applied.

4. Substrate with Cured Film

The substrate with the cured film of the invention is not particularly restricted, as long as the substrate has the cured film of the invention. In particular, the substrate preferably has the above cured film on at least one kind of substrate selected from the group of the glass substrate, the ITO substrate and the resin film substrate.

Such a substrate with the cured film can be formed by applying the composition of the invention on the substrate such as glass, ITO, PET and PEN wholly or in a predetermined pattern shape (line shape or the like) by applying the application method or the like, and then being subjected to the drying treatment and the curing treatment as described above, for example.

5. Electronic Component

The electronic component of the invention is an electronic component having the cured film or the substrate with the cured film. Specific examples of such an electronic component include various optical materials such as a color filter, an LED light-emitting element and a light-receiving element, and a touch panel.

The touch panel can be manufactured by combining a liquid crystal display device or an organic electroluminescence device with a position detecting device, for example.

Here, specific examples of the position detecting device include a device prepared such that a cured film (transparent insulating film) of the invention is formed on a substrate formed with an interconnection (X electrode) made of a conductive substance such as ITO so as to cover the interconnection, and then an interconnection (Y electrode) made of a conductive substance such as ITO is formed thereon so as to cross the X electrode, and then an overcoat is formed with the cured film of the invention so as to cover the substrate surface.

Upon manufacturing of such a device, the cured film (transparent insulating film) formed in the pattern shape ordinarily by the printing method or the like, and the overcoat formed on a whole surface ordinarily by the application method or the like can be formed with one kind of composition by the composition of the invention. Accordingly, upon manufacturing the electronic component, line simplification and improvement in a yield can be attained by using the composition of the invention.

EXAMPLES

The invention will be described by way of Examples and Comparative Examples below, but the invention is not limited to the Examples. A name and an abbreviation thereof are presented for tetracarboxylic dianhydride (a1), diamine (a2), polyhydric hydroxy compound (a3), monohydric alcohol (a4), reaction solvent (a5), epoxy compound (B) having a fluorene skeleton, epoxy curing agent (C), solvent (D), epoxy compound (e), coupling agent (f), epoxy curing accelerator (i), antioxidant (g), polymerizable monomer (j) and surfactant (h) to be used in Examples and Comparative Examples. The abbreviation is used in the description below.
Tetracarboxylic Dianhydride (a1)
ODPA: 3,3',4,4'-diphenyl ether tetracarboxylic dianhydride
Diamine (a2)
DDS: 3,3'-diaminodiphenyl sulfone
Polyhydric Hydroxy Compound (a3)
BDOH: 1,4-butanediol
Monohydric Alcohol (a4)
BzOH: benzyl alcohol
Reaction Solvent (a5)
MPM: methyl 3-methoxypropionate
PGMEA: propylene glycol monoethyl ether acetate
Styrene-maleic anhydride copolymer
SMA1000: SMA1000 (trade name, made by Sartomer Company, Inc., styrene component/maleic anhydride component: 50/50, weight average molecular weight: 5,500)
Epoxy Compound (B) Having Fluorene Skeleton
PG-100: OGSOL PG-100 (trade name, made by Osaka Gas Chemicals Co., Ltd.)
CG-500: OGSOL CG-500 (trade name, made by Osaka Gas Chemicals Co., Ltd.)
EG-200: OGSOL EG-200 (trade name, made by Osaka Gas Chemicals Co., Ltd.)
EG-250: OGSOL EG-250 (trade name, made by Osaka Gas Chemicals Co., Ltd.)
EG-280: OGSOL EG-280 (trade name, made by Osaka Gas Chemicals Co., Ltd.)
Epoxy Compound (e)
VG: TECHMORE VG3101L (trade name, made by Printec Corporation)
BG: butyl methacrylate/glycidyl methacrylate copolymer (mole ratio 20:80, weight average molecular weight: 80,000)
EHPE3150: EHPE3150 (trade name, made by Daicel Corporation)
SQ: compound represented by formula (1-1) as synthesized by a method described in JP 2009-167390 A 157S70: 157S70 (trade name, made by Mitsubishi Chemical Corporation)
FLEP-60: FLEP-60 (trade name, made by Toray Thiokol Co., Ltd.) EPPN-501H:
EPPN-501H (trade name, made by Nippon Kayaku Co., Ltd.)
Coupling Agent (f)
GMS: γ-glycidoxypropyltrimethoxysilane
Epoxy Curing Accelerator (i)
CP-001: CP-001 (trade name, made by Osaka Gas Chemicals Co., Ltd.)
U-CAT SA506: U-CAT SA506 (trade name, made by San Apro Ltd.)
Antioxidant (g)
I1010: IRGANOX 1010 (trade name, made by BASF SE)
Polymerizable Monomer (j)
UV-1700 B: UV-1700B (trade name, made by Nippon Synthetic Chemical Industry Co., Ltd.)
Surfactant (h)
BYK344: BYK-344 (trade name, made by BYK Japan KK)

First, a polyester amide acid solution was prepared as described below (Synthesis Examples 1 to 3). Synthesis Examples 1 to 3 were summarized in Table 1.

Synthesis Example 1

Into a 1000 mL separable flask equipped with a thermometer, a stirring blade, an opening for feeding a raw material and a nitrogen gas inlet, 446.96 g of MPM subjected to dehydration and purification, 31.93 g of BDOH, 25.54 g of BzOH and 183.20 g of ODPA were fed, and the resulting mixture was stirred at 130° C. for 3 hours under a dry nitrogen gas flow. Then, the resulting reaction mixture was cooled to 25° C., 29.33 g of DDS and 183.04 g of MPM were charged thereto, and the resulting mixture was stirred at 20 to 30° C. for 2 hours, and then further stirred at 115° C. for

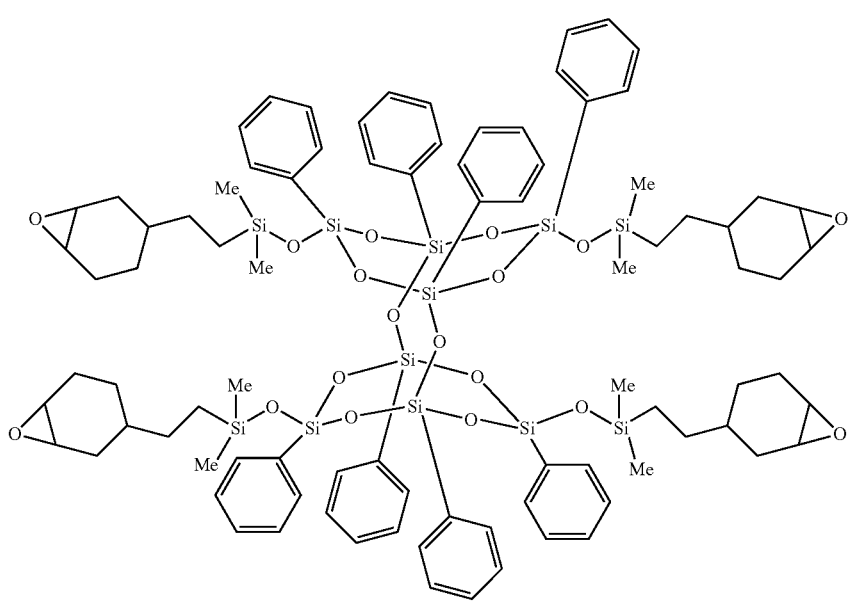

(1-1)

1 hour. Then, the resulting mixture was cooled to 30° C. or less to obtain a 30 wt % solution of light yellow transparent polyester amide acid.

A rotational viscosity of the solution was 28.1 mPa·s. The rotational viscosity here is viscosity measured at 25° C. using an E-type viscometer (trade name: VISCONIC END, made by Tokyo Keiki Co., Ltd.) (the same shall apply hereafter).

A weight average molecular weight of the thus obtained polyester amide acid was 4,200. The weight average molecular weight of the polyester amide acid was measured as described below.

The obtained polyester amide acid was diluted with N,N-dimethylformamide (DMF) so as to be about 1% by weight in a concentration of polyamide acid, a GPC apparatus: Chrom Nav (differential refractometer RI-2031 Plus), made by JASCO Corporation was used, and measurement was carried out by a GPC method in which the diluted solution was used as a developer, and the molecular weight was determined by obtaining a polystyrene equivalent. As a column, three columns of GF-1G7B, GF-510HQ and GF-310HQ were connected in this order and used, each being made by Showa Denko K.K., and the measurement was carried out under conditions of a column temperature of 40° C. and a flow rate/min of 0.5 mL (the same shall apply hereafter).

Synthesis Example 2

A 500 mL flask equipped with a thermometer and a stirring blade was subjected to nitrogen substitution, 13.03 g of DDS and 14.19 g of BDOH were fed thereinto, and then 280 g of MPM subjected to dehydration and purification was fed thereto, and the resulting mixture was stirred at room temperature to dissolve DDS and BDOH thereinto. Then, 81.42 g of ODPA and 11.35 g of BzOH were charged thereinto. The resulting mixture was heated to 130° C. in an oil bath, and stirred at the temperature for 4 hours, and then cooled to 30° C. or less to obtain a 30 wt % solution of light yellow transparent polyamide acid having an ester group.

A rotational viscosity of the solution was 19.8 mPa·s. A weight average molecular weight measured by GPC was 4,400 (polystyrene equivalent).

Synthesis Example 3

A 500 mL flask equipped with a thermometer and a stirring blade was subjected to nitrogen substitution, and 224.0 g of PGMEA subjected to dehydration and purification, 16.96 g of ODPA, 51.6 g of SMA1000, 19.7 g of BzOH and 3.28 g of BDOH were fed thereinto. Next, the resulting mixture was heated to 130° C. in an oil bath, and stirred at the temperature for 2 hours, and then cooled to 30° C. or less, and subsequently 4.52 g of DDS was charged thereto. The resulting mixture was stirred at room temperature for 2 hours, and then heated to 115° C., and stirred at the temperature for 1 hour, and then cooled to 30° C. or less to obtain a 30 wt % solution of light yellow transparent polyamide acid having an ester group.

A rotational viscosity of the solution was 35.3 mPa·s. A weight average molecular weight measured by GPC was 24,000 (polystyrene equivalent).

TABLE 1

| | | Synthesis Example | | |
|---|---|---|---|---|
| | | 1 | 2 | 3 |
| Tetracarboxylic dianhydride (a1) | ODPA (g) | 183.20 | 81.42 | 16.96 |
| Diamine (a2) | DDS (g) | 29.33 | 13.03 | 4.52 |
| Polyhydric hydroxy compound (a3) | BDOH (g) | 31.93 | 14.19 | 3.28 |
| Monohydric alcohol (a4) | BzOH (g) | 25.54 | 11.35 | 19.7 |
| Styrene-maleic anhydride copolymer | SMA 1000 (g) | | | 51.6 |
| Reaction solvent (a5) | MPM (g) | 630 | 280 | |
| | PGMEA | | | 224 |
| Viscosity (25° C.) (mPa · s) | | 28.1 | 19.8 | 35.3 |
| Solid concentration (% by weight) | | 30 | 30 | 30 |

Example 1

A 100 mL three-necked flask equipped with a stirring blade was subjected to nitrogen substitution, 10 g of the polyester amide acid solution obtained in Synthesis Example 2, 2.5 g of EG-200, 0.5 g of EG-280, 0.3 g of TMA, 0.3 g of GMS and 19.2 g of MPM subjected to dehydration and purification were fed thereinto, and the resulting mixture was stirred for 1 hour to uniformly dissolve each component thereinto. Then, 0.07 g of BYK344 was charged thereinto, and the resulting mixture was stirred at room temperature for 1 hour, and subjected to filtration with a membrane filter (0.2 μm) to obtain a filtrate (thermosetting resin composition).

Example 2

A 100 mL three-necked flask equipped with a stirring blade was subjected to nitrogen substitution, 10 g of the polyester amide acid solution obtained in Synthesis Example 1, 6.0 g of EG-200, 0.6 g of TMA, 0.48 g of GMS, 0.05 g of I1010 and 12.4 g of MPM subjected to dehydration and purification were fed thereinto, and the resulting mixture was stirred for 1 hour to uniformly dissolve each component. Then, 0.05 g of BYK344 was charged thereinto, and the resulting mixture was stirred at room temperature for 1 hour, and subjected to filtration with a membrane filter (0.2 μm) to obtain a filtrate (thermosetting resin composition).

Examples 3 to 9, Comparative Examples 5 to 6

In Examples 3 to 9 and Comparative Examples 5 to 6, thermosetting resin compositions were prepared in a manner similar to Example 2 except that a kind of each component and an amount of feeding each component were changed as described in Table 2.

Example 10

A 100 mL three-necked flask equipped with a stirring blade was subjected to nitrogen substitution, 7.1 g of the polyester amide acid solution obtained in Synthesis Example 1, 1.4 g of EG-200, 4.8 g of TMA, 1.2 g of GMS, 0.035 g of I1010, 2.7 g of EHPE3150 as epoxy compound (e) and 32.5 g of MTM subjected to dehydration and purification were fed thereinto, and the resulting mixture was stirred for 1 hour to uniformly dissolve each component thereinto. Then, 0.05 g of BYK344 was charged thereinto, and the resulting mixture was stirred at room temperature for 1 hour, and subjected to filtration with a membrane filter (0.2 μm) to obtain a filtrate (thermosetting resin composition).

Examples 11 to 14

In Examples 11 to 14, thermosetting resin compositions were prepared in a manner similar to Example 10 except that a kind of each component and an amount of feeding each component were changed as described in Table 2.

Example 15

A 100 mL three-necked flask equipped with a stirring blade was subjected to nitrogen substitution, 2.2 g of the polyester amide acid solution obtained in Synthesis Example 1, 0.7 g of EG-200, 0.2 g of TMA, 0.4 g of GMS, 5.5 g of UV-1700B, 1.3 g of FLEP-60 as epoxy compound (e) and 19.2 g of MTM subjected to dehydration and purification were fed thereinto, and the resulting mixture was stirred for 1 hour to uniformly dissolve each component thereinto. Then, 0.07 g of BYK344 was charged thereinto, and the resulting mixture was stirred at room temperature for 1 hour, and subjected to filtration with a membrane filter (0.2 μm) to obtain a filtrate (thermosetting resin composition).

Example 16

A 100 mL three-necked flask equipped with a stirring blade was subjected to nitrogen substitution, 3.8 g of the polyester amide acid solution obtained in Synthesis Example 1, 2.3 g of EG-200, 0.34 g of TMA, 0.18 g of GMS, 0.02 g of I1010, 0.15 g of U-CAT SA506 and 13.0 g of MTM subjected to dehydration and purification were fed thereinto, and the resulting mixture was stirred for 1 hour to uniformly dissolve each component thereinto. Then, 0.07 g of BYK344 was charged thereinto, and the resulting mixture was stirred at room temperature for 1 hour, and subjected to filtration with a membrane filter (0.2 μm) to obtain a filtrate (thermosetting resin composition).

Comparative Example 1

A 100 mL three-necked flask equipped with a stirring blade was subjected to nitrogen substitution, 10 g of the polyester amide acid solution obtained in Synthesis Example 2, 3.0 g of BG, 0.3 g of TMA, 0.3 g of GMS and 55.8 g of MPM subjected to dehydration and purification were fed thereinto, and the resulting mixture was stirred for 1 hour to uniformly dissolve each component thereinto. Then, 0.07 g of BYK344 was charged thereinto, and the resulting mixture was stirred at room temperature for 1 hour, and subjected to filtration with a membrane filter (0.2 μm) to obtain a filtrate (thermosetting resin composition).

Comparative Example 2

A thermosetting resin composition was prepared in a manner similar to Comparative Example 1 except that a kind of each component and an amount of feeding each component were changed as described in Table 2.

Comparative Example 3

A 100 mL three-necked flask equipped with a stirring blade was subjected to nitrogen substitution, 10 g of the polyester amide acid solution obtained in Synthesis Example 1, 6.0 g of VG, 0.6 g of TMA, 0.48 g of GMS, 0.05 g of I1010, 18.7 g of MPM subjected to dehydration and purification, and 6.4 g of EDM were fed thereinto, and the resulting mixture was stirred for 1 hour to uniformly dissolve each component thereinto. Then, 0.05 g of BYK344 was charged thereinto, and the resulting mixture was stirred at room temperature for 1 hour, and subjected to filtration with a membrane filter (0.2 μm) to obtain a filtrate (thermosetting resin composition).

Comparative Example 4

A thermosetting resin composition was prepared in a manner similar to Comparative Example 3 except that a kind of each component and an amount of feeding each component were changed as described in Table 2.

TABLE 2

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Polyester amide acid (A) | Synthesis Example 1 | | 10 | 10 | 10 | 10 | 10 | 10 | 10 | 10 | 10 | 7.1 | 7.1 |
| | Synthesis Example 2 | 10 | | | | | | | | | | |
| | Synthesis Example 3 | | | | | | | | | | | |
| Epoxy compound (B) having fluorene skeleton | PG-100 | | | | | | | | 3 | | | 1.1 |
| | CG-500 | | | | | 3 | 3 | | | | | |
| | EG-200 | 2.5 | 6 | 6 | 6 | 4.5 | 3 | 1.5 | 3 | | 1.4 | 3.2 |
| | EG-250 | | | | | | | | | 6 | | |
| | EG-280 | 0.5 | | | | 1.5 | | 1.5 | | | | |
| Epoxy curing agent (c) | TMA | 0.3 | 0.6 | 0.9 | 0.9 | 0.9 | 0.9 | 0.9 | 0.9 | 0.9 | 4.8 | 0.32 |
| Solvent (D) | EDM | | | | | | | | | | | |
| | MTM | | | | 12.4 | | | | | | 32.5 | 17.4 |
| | MPM | 19.2 | 12.4 | 12.4 | | 12.4 | 12.4 | 12.4 | 12.4 | 12.4 | | |
| Epoxy compound (e) having two or more oxirane rings or oxetane rings in the molecule | VG | | | | | | | | | | | |
| | BG | | | | | | | | | | | |
| | EHPE3150 | | | | | | | | | | | 2.7 |
| | SQ 157S70 | | | | | | | | | | | |
| | FLEP-60 | | | | | | | | | | | |
| | EPPN-501H | | | | | | | | | | | |

TABLE 2-continued

| | | | | | | | | | | | | |
|---|---|---|---|---|---|---|---|---|---|---|---|---|
| Coupling agent (f) | GMS | 0.3 | 0.48 | 0.48 | 0.48 | 0.48 | 0.48 | 0.48 | 0.48 | 0.48 | 1.2 | 0.34 |
| Epoxy curing accelerator (i) | CP-001 U-CAT SA506 | | | | | | | | | | | 0.32 |
| Antioxidant (g) | 11010 | | 0.05 | 0.05 | 0.05 | 0.05 | 0.05 | 0.05 | 0.05 | 0.05 | 0.035 | 0.03 |
| Polymerizable monomer (j) | UV-1700B | | | | | | | | | | | |
| Surfactant (h) | BYK344 | 0.07 | 0.05 | 0.05 | 0.05 | 0.05 | 0.05 | 0.05 | 0.05 | 0.05 | 0.05 | 0.05 |

| | | Example | | | | | Comparative Example | | | | | |
|---|---|---|---|---|---|---|---|---|---|---|---|---|
| | | 12 | 13 | 14 | 15 | 16 | 1 | 2 | 3 | 4 | 5 | 6 |
| Polyester amide acid (A) | Synthesis Example 1 | | | 10 | 2.2 | 3.8 | | | 10 | 10 | | |
| | Synthesis Example 2 | | | | | | 10 | 10 | | | | |
| | Synthesis Example 3 | 7.5 | 7.5 | | | | | | | | | |
| Epoxy compound (B) having fluorene skeleton | PG-100 | | | | | | | | | | | |
| | CG-500 | | | | | | | | | | | |
| | EG-200 | 1.7 | 1.7 | 2 | 0.7 | 2.3 | | | | | 6 | 6 |
| | EG-250 | | | | | | | | | | | |
| | EG-280 | | | | | | | | | | | |
| Epoxy curing agent (c) | TMA | 0.7 | 0.7 | 0.3 | 0.2 | 0.34 | 0.3 | 0.3 | 0.6 | 0.6 | 1.3 | 0.9 |
| Solvent (D) | EDM | | | | | | | | 6.4 | | | |
| | MTM | 17.2 | 17.2 | 19.2 | 19.2 | 13 | | | | | | |
| | MPM | | | | | | 55.8 | 19.2 | 18.7 | 12.4 | 14.4 | 12.4 |
| Epoxy compound (e) having two or more oxirane rings or oxetane rings in the molecule | VG | | | | | | | | 6.0 | 6.0 | | |
| | BG | | | | | | 3.0 | 3.0 | | | | |
| | EHPE3150 | | | | | | | | | | | |
| | SQ | 1.5 | 1.3 | | | | | | | | | |
| | 157S70 | 1.1 | | | | | | | | | | |
| | FLEP-60 | | | 1 | 1.3 | | | | | | | |
| | EPPN-501H | 1.2 | | | | | | | | | | |
| Coupling agent (f) | GMS | 0.48 | 0.48 | 0.3 | 0.4 | 0.18 | 0.3 | 0.3 | 0.48 | 0.48 | 0.48 | 0.48 |
| Epoxy curing accelerator (i) | CP-001 U-CAT SA506 | | | | | 0.15 | | | | | | |
| Antioxidant (g) | 11010 | 0.03 | 0.03 | | | 0.02 | | | 0.05 | 0.05 | 0.05 | 0.05 |
| Polymerizable monomer (j) | UV-1700B | | | | 5.5 | | | | | | | |
| Surfactant (h) | BYK344 | 0.05 | 0.05 | 0.07 | 0.07 | 0.07 | 0.07 | 0.07 | 0.05 | 0.05 | 0.05 | 0.05 |

The thermosetting resin composition obtained as described above was subjected to spin coating on a glass substrate and an ITO substrate so as to have a thickness shown in Table 3 in a thickness of the resulting cured film, and the composition applied was dried at 80° C. on a hot plate for 5 minutes to form a coating film. Then, a cured film was obtained by heating the coating film at 230° C. for 30 minutes in an oven in Examples 1 to 14 and Comparative Examples 1 to 6, a cured film was obtained by irradiating the coating film with light to be 2,000 mJ/cm$^2$ in an accumulated amount of exposure at a wavelength of 365 nm by using a UV irradiation apparatus J-CURE 1500 (trade name) made by Jatec Corporation, and then heating the resulting coating film at 120° C. for 30 minutes in an oven in Example 15, and a cured film was obtained by heating the coating film at 120° C. for 10 minutes in an oven in Example 16. The thus obtained cured films were evaluated in transparency, adhesion, surface hardness and chemical resistance. Evaluation results are shown in Table 3.

Evaluation Method (i) Transparency

The thus obtained glass substrate with the cured film was used, and transmittance of the cured film was measured at a wavelength of 400 nm by spectrophotometer V-670 (made by JEOL Co., Ltd.).

(ii) Adhesion

The thus obtained glass substrate with the cured film and ITO substrate with the cured film were immersed into ultrapure water at 60° C. for 60 minutes, and then a cross-cut test by tape peeling (JIS-K-5400) was conducted, and adhesion between the cured film and the substrate was evaluated by counting the number of remaining cross-cuts. The case where the ratio was 100/100 in terms of the number of remaining cross-cuts/100 was taken as excellent, and the case where the ratio was 99/100 or less in terms of the number thereof was taken as poor.

(iii) Surface Hardness

Surface hardness on a surface of the cured film was measured by a pencil hardness tester by using the obtained glass substrate with the cured film in accordance with JIS-K-5400.

(iv) Chemical Resistance

The obtained glass substrate with the cured film and ITO substrate with the cured film were immersed into a 3.5% oxalic acid aqueous solution at 40° C. for 6 minutes. Then, a change in film thickness of the cured film before and after the immersion was measured using a stylus-type surface profilometer XP-200 (made by AMBIOS TECHNOLOGY, Inc.), and the case where the change in film thickness is less than ±3% was taken as excellent, and the case where the change in film thickness was ±3% or more was taken as poor. Moreover, transmittance before and after the immersion was observed in a manner similar to (i), and the case where a change in transmittance was less than ±1% was taken as excellent, and the case where the change in transmittance was ±1% or more was taken as poor.

TABLE 3

|  |  | Example | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| (i) Transparency | Transmittance % at 400 nm | 97.4 | 96.6 | 97.0 | 96.9 | 97.5 | 95.7 | 95.7 | 96.9 | 97.3 | 97.7 | 96.7 |
| (ii) Adhesion | Glass substrate | ○ | ○ | ○ | ○ | ○ | ○ | ○ | ○ | ○ | ○ | ○ |
|  | ITO substrate | ○ | ○ | ○ | ○ | ○ | ○ | ○ | ○ | ○ | ○ | ○ |
| (iii) Surface hardness | Pencil hardness | 2H | 2H | H | H | H | 2H | 3H | 2H | H | 4H | H |
| (iv) Chemical resistance (3.5% oxalic acid) | Glass/transmittance | ○ | ○ | ○ | ○ | ○ | ○ | ○ | ○ | ○ | ○ | ○ |
|  | Glass/film thickness change | ○ | ○ | ○ | ○ | ○ | ○ | ○ | ○ | ○ | ○ | ○ |
|  | ITO/transmittance | ○ | ○ | ○ | ○ | ○ | ○ | ○ | ○ | ○ | ○ | ○ |
|  | ITO/film thickness change | ○ | ○ | ○ | ○ | ○ | ○ | ○ | ○ | ○ | ○ | ○ |
| Film thickness | μm | 2.0 | 2.3 | 2.2 | 2.2 | 2.2 | 2.3 | 2.2 | 2.1 | 2.2 | 2.2 | 2.2 |

|  |  | Example | | | | | Comparative Example | | | | | |
|---|---|---|---|---|---|---|---|---|---|---|---|---|
|  |  | 12 | 13 | 14 | 15 | 16 | 1 | 2 | 3 | 4 | 5 | 6 |
| (i) Transparency | Transmittance % at 400 nm | 97.2 | 96.4 | 97.4 | 97.4 | 96.8 | 98.1 | 98.3 | 98.5 | 98.4 | 96.5 | 96.8 |
| (ii) Adhesion | Glass substrate | ○ | ○ | ○ | ○ | ○ | ○ | ○ | ○ | ○ | X | X |
|  | ITO substrate | ○ | ○ | ○ | ○ | ○ | X | X | X | X | X | X |
| (iii) Surface hardness | Pencil hardness | H | H | H | 5H | F | 2H | 2H | 2H | 2H | H | H |
| (iv) Chemical resistance (3.5% oxalic acid) | Glass/transmittance | ○ | ○ | ○ | ○ | ○ | ○ | ○ | ○ | ○ | ○ | ○ |
|  | Glass/film thickness change | ○ | ○ | ○ | ○ | ○ | ○ | ○ | ○ | ○ | ○ | X |
|  | ITO/transmittance | ○ | ○ | ○ | ○ | ○ | ○ | ○ | ○ | ○ | ○ | ○ |
|  | ITO/film thickness change | ○ | ○ | ○ | ○ | ○ | ○ | ○ | ○ | ○ | ○ | X |
| Film thickness | μm | 2.0 | 2.1 | 2.1 | 2.1 | 2.1 | 2.0 | 2.2 | 2.0 | 2.2 | 2.1 | 2.4 |

Note:
the symbol of "○" and "X" mean "excellent" and "poor" respectively.

The cured film made from the thermosetting resin composition obtained in Comparative Examples 1 to 6 was poor in adhesion to ITO, the cured film formed thereof in Comparative Examples 5 to 6 was poor in adhesion to glass, and the cured film formed thereof in Comparative Examples 6 was poor in resistance to the oxalic acid aqueous solution.

In contrast, as is obvious from the results shown in Table 3, the cured film made from the thermosetting resin composition obtained in Examples 1 to 16 was excellent in adhesion to glass and ITO, and high in transparency as much as 95% or more in light transmission at the wavelength of 400 nm, and F or more in surface hardness. Further, the cured film was excellent in resistance to the oxalic acid aqueous solution, and well balanced in high transparency, hardness, adhesion to glass or ITO, and resistance to the oxalic acid aqueous solution.

As described above, only the cured film obtained from the composition containing the polyester amide acid, the epoxy compound having the fluorene skeleton, and the epoxy curing agent was allowed to satisfy all of desired characteristics.

INDUSTRIAL APPLICABILITY

In view of capability of forming a cured film excellent in characteristics as an optical material, such as adhesion and transparency, a composition of the invention can be preferably used as a material for forming a protective film for various optical materials such as a color filter, an LED light-emitting element and a light receiving element, and a material for forming a touch panel (for forming an insulating film for a transparent electrode and an overcoat film to be used in the touch panel).

The invention claimed is:

1. A thermosetting resin composition, comprising polyester amide acid (A), epoxy compound (B) having a fluorene skeleton and epoxy curing agent (C), wherein an epoxy equivalent of epoxy compound (B) is 259 to 550 g/eq, and a refractive index of epoxy compound (B) is 1.50 to 1.75.

2. The thermosetting resin composition according to claim 1, comprising 1 to 380 parts by weight of epoxy curing agent (C) based on 100 parts by weight in a total amount of epoxy compounds having two or more oxirane rings or oxetane rings in a molecule in the thermosetting resin composition.

3. The thermosetting resin composition according to claim 1, comprising 10 to 400 parts by weight of epoxy compound (B) based on 100 parts by weight of polyester amide acid (A).

4. The thermosetting resin composition according to claim 1, wherein epoxy curing agent (C) is an acid anhydride curing agent.

5. The thermosetting resin composition according to claim 1, wherein a weight average molecular weight of polyester amide acid (A) is 2,000 to 30,000.

6. The thermosetting resin composition according to claim 1, wherein polyester amide acid (A) has a constitutional unit represented by formulas (3) and (4):

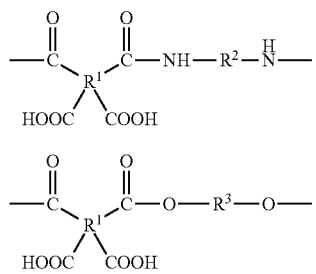

wherein, $R^1$ is independently a tetravalent organic group having 1 to 30 carbons, $R^2$ is a divalent organic group having 1 to 40 carbons and $R^3$ is a divalent organic group having 1 to 20 carbons.

7. The thermosetting resin composition according to claim 1, wherein polyester amide acid (A) is a compound obtained from reaction between a component comprising tetracarboxylic dianhydride (a1), a component comprising diamine (a2) and a component comprising polyhydric hydroxy compound (a3).

8. The thermosetting resin composition according to claim 7, wherein tetracarboxylic dianhydride (a1) includes one or more kinds of compounds selected from the group of 3,3',4,4'-diphenylsulfone tetracarboxylic dianhydride, 3,3 ',4,4'-diphenyl ether tetracarboxylic dianhydride, 2,2-(bis(3,4-dicarboxyphenyl)hexafluoropropane dianhydride and ethyleneglycol bis(anhydrotrimellitate).

9. The thermosetting resin composition according to claim 7, wherein diamine (a2) includes one or more kinds of compounds selected from the group of 3,3'-diaminodiphenyl sulfone and bis[4-(3-aminophenoxy)phenyl]sulfone.

10. The thermosetting resin composition according to claim 7, wherein polyhydric hydroxy compound (a3) includes one or more kinds of compounds selected from the group of ethylene glycol, propylene glycol, 1,4-butanediol, 1,5-pentanediol, 1,6-hexanediol, 1,7-heptanediol and 1,8-octanediol.

11. The thermosetting resin composition according to claim 7, wherein tetracarboxylic dianhydride (a1) is 3,3',4,4'-diphenyl ether tetracarboxylic dianhydride, diamine (a2) is 3,3'-diaminodiphenyl sulfone, polyhydric hydroxy compound (a3) is 1,4-butanediol and epoxy curing agent (C) is trimellitic anhydride.

12. The thermosetting resin composition according to claim 1, wherein polyester amide acid (A) is a compound obtained from reaction between a component comprising tetracarboxylic dianhydride (a1), a component comprising diamine (a2), a component comprising polyhydric hydroxy compound (a3) and a component comprising monohydric alcohol (a4).

13. The thermosetting resin composition according to claim 12, wherein monohydric alcohol (a4) includes one or more kinds of compounds selected from the group of isopropyl alcohol, allyl alcohol, benzyl alcohol, hydroxyethyl methacrylate, propylene glycol monoethyl ether and 3-ethyl-3-hydroxymethyloxetane.

14. The thermosetting resin composition according to claim 1, wherein polyester amide acid (A) is a compound obtained from reaction between X mol of tetracarboxylic dianhydride (a1), Y mol of diamine (a2) and Z mol of polyhydric hydroxy compound (a3) at such a ratio of satisfying a relationship represented by formula (1) and formula (2):

$$0.2 \leq Z/Y \leq 8.0 \tag{1}$$

$$0.2 \leq (Y+Z)/X \leq 1.5 \tag{2}.$$

15. The thermosetting resin composition according to claim 1, further comprising solvent (D).

16. A cured film, obtained from the thermosetting resin composition according to claim 1.

17. A substrate with a cured film, comprising the cured film according to claim 16.

18. An electronic component, comprising the cured film according to claim 16.

19. The electronic component according to claim 18, being a touch panel.

20. The thermosetting resin composition according to claim 1, wherein the thermosetting resin composition is a printing composition.

* * * * *